United States Patent
Golubev et al.

(10) Patent No.: US 12,028,304 B2
(45) Date of Patent: Jul. 2, 2024

(54) SYSTEM AND METHOD FOR RESTRICTING THE RECEPTION OF E-MAILS FROM A SENDER OF BULK SPAM MAIL

(71) Applicant: AO Kaspersky Lab, Moscow (RU)

(72) Inventors: Dmitry S. Golubev, Moscow (RU); Roman A Dedenok, Moscow (RU); Yury G. Slobodyanuk, Moscow (RU)

(73) Assignee: AO Kaspersky Lab, Moscow (RU)

( * ) Notice: Subject to any disclaimer, the term of this patent is extended or adjusted under 35 U.S.C. 154(b) by 16 days.

(21) Appl. No.: 17/949,308

(22) Filed: Sep. 21, 2022

(65) Prior Publication Data
US 2023/0198926 A1  Jun. 22, 2023

(30) Foreign Application Priority Data
Dec. 17, 2021 (RU) .......................... RU2021137562

(51) Int. Cl.
H04L 51/212 (2022.01)
(52) U.S. Cl.
CPC ................................. H04L 51/212 (2022.05)
(58) Field of Classification Search
CPC .................................................... H04L 51/212
See application file for complete search history.

(56) References Cited

U.S. PATENT DOCUMENTS

| | | | |
|---|---|---|---|
| 7,543,053 B2 * | 6/2009 | Goodman | H04L 51/212 709/224 |
| 7,735,116 B1 * | 6/2010 | Gauvin | H04L 63/102 713/153 |
| 9,647,975 B1 * | 5/2017 | Dedenok | H04L 51/212 |
| 2005/0198159 A1 | 9/2005 | Kirsch | |
| 2006/0095524 A1 | 5/2006 | Kay et al. | |
| 2008/0027891 A1 * | 1/2008 | Repasi | G06F 21/577 706/52 |
| 2011/0106890 A1 * | 5/2011 | Karpov | G06Q 10/107 709/206 |
| 2014/0165130 A1 * | 6/2014 | Zaitsev | G06F 21/00 726/1 |
| 2016/0182454 A1 * | 6/2016 | Phonsa | H04L 63/0263 726/11 |
| 2021/0120022 A1 * | 4/2021 | Kaderábek | H04L 63/1491 |

FOREIGN PATENT DOCUMENTS

| | | |
|---|---|---|
| CN | 101141416 A | 3/2008 |
| WO | 2012075336 A1 | 6/2012 |

* cited by examiner

*Primary Examiner* — Minh Chau Nguyen
(74) *Attorney, Agent, or Firm* — ArentFox Schiff LLP; Michael Fainberg

(57) ABSTRACT

A method for restricting reception of e-mail messages from a sender of bulk spam mail includes identifying an unknown sender of received e-mail messages. A set of e-mail messages received from the identified sender is selected. A type of bulk spam mailing is determined based on the selected set of e-mail messages using one or more spam identification signatures. Restrictions on reception of e-mail messages from a sender distributing bulk spam of the determined type are generated.

20 Claims, 4 Drawing Sheets

SYSTEM AND METHOD FOR RESTRICTING THE RECEPTION OF E-MAILS FROM A SENDER OF BULK SPAM MAIL

CROSS-REFERENCE TO RELATED APPLICATION

This application claims benefit of priority under 35 U.S.C. 119(a)-(d) to a Russian Application No. 2021137562 filed on Dec. 17, 2021, which is incorporated by reference herein.

FIELD OF TECHNOLOGY

The present invention relates generally to the field of information security and, more specifically, to systems and methods for managing the process of receiving electronic messages from various senders.

BACKGROUND

Presently, the number of users, the number of companies and the diversity of their activities continues to grow. At the same time, the number of transmitted e-mail messages is also increasing.

Online advertising is one of the cheapest ways to advertise. Spam messages, as the main and most widespread form of advertising in the modern world, occupy over 70% of the total volume of email traffic.

Spam is a mass mailing of advertising or other form of information to people who have not expressed a desire to receive it. Spam includes, but is not limited to, electronic messages sent by electronic mail, instant messaging services, in social media, blogs, dating sites, forums, as well as via SMS (Short Message Service) and MMS (Multimedia Messaging Service) messages.

Given the continual growth in volumes of spam mailing, problems of a technical, economic, and criminal nature arise. The strain on hardware and data transmission channels, the time spent by users processing e-mails, and the shift in the general direction of e-mails toward fraud and theft, among other aspects, demonstrate the urgent need to wage a constant battle against spam.

There are many anti-spam applications for counteracting mass spamming. One effective method is to use trained machine learning models (e.g., classifiers) to identify undesirable e-mails containing spam.

Known solutions partially categorize junk e-mail messages according to the sender, but do not effectively address the problem of modifying restrictions on the reception of e-mail messages from a sender of bulk spam messages sent by electronic mail.

Thus, there is a need for systems to effectively manage the process of receiving electronic messages from different senders.

SUMMARY

Disclosed are systems and methods for managing restrictions on the reception of e-mails from senders.

Advantageously, the disclosed method provides protection against receiving e-mails containing spam by creating and changing restrictions on receiving e-mails from senders who send bulk spam mail.

In one aspect, a method for restricting reception of e-mail messages from a sender of bulk spam mail includes identifying an unknown sender of received e-mail messages. A set of e-mail messages received from the identified unknown sender is selected. A type of bulk spam mailing is determined based on the selected set of e-mail messages using one or more spam identification signatures. Restrictions on reception of e-mail messages from a sender distributing bulk spam of the determined type are generated.

In one aspect, the method further includes checking the generated restrictions for conflicts using one or more conflict identification rules from a rule database; and modifying the generated restrictions in response to detecting a conflict.

In one aspect, the sender is identified by generating a profile of the sender of the received e-mail messages; and comparing the generated profile with known sender profiles from a sender database.

In one aspect, profile of the sender includes one or more of: a hash code of a body of the received e-mail message, a hash code of a header of the received e-mail message, a domain name of the sender of the received e-mail message, an IP address of the sender of the received e-mail message, a hash code of an HTML-layout of the received e-mail message.

In one aspect, the sender database is configured to store profiles of known senders.

In one aspect, generation of restrictions includes temporary inclusion of the generated profile of the sender to a list of prohibited senders.

In one aspect, the one or more conflict identification rules includes a set of conditions satisfaction of which indicates that the generated restriction needs a modification.

In one aspect, the generated restriction is modified, if the conflict is detected, by excluding an IP address that caused the conflict from the list of prohibited senders.

In one aspect, the generated restriction is modified, if the conflict is detected, by excluding a domain name that caused the conflict from the list of prohibited senders.

In one aspect, the method further includes, in response to detecting the conflict, modifying the profile of the sender in which the conflict was detected.

BRIEF DESCRIPTION OF THE DRAWINGS

The accompanying drawings, which are incorporated into and constitute a part of this specification, illustrate one or more example aspects of the present disclosure and, together with the detailed description, serve to explain their principles and implementations.

DETAILED DESCRIPTION

Figure 1:
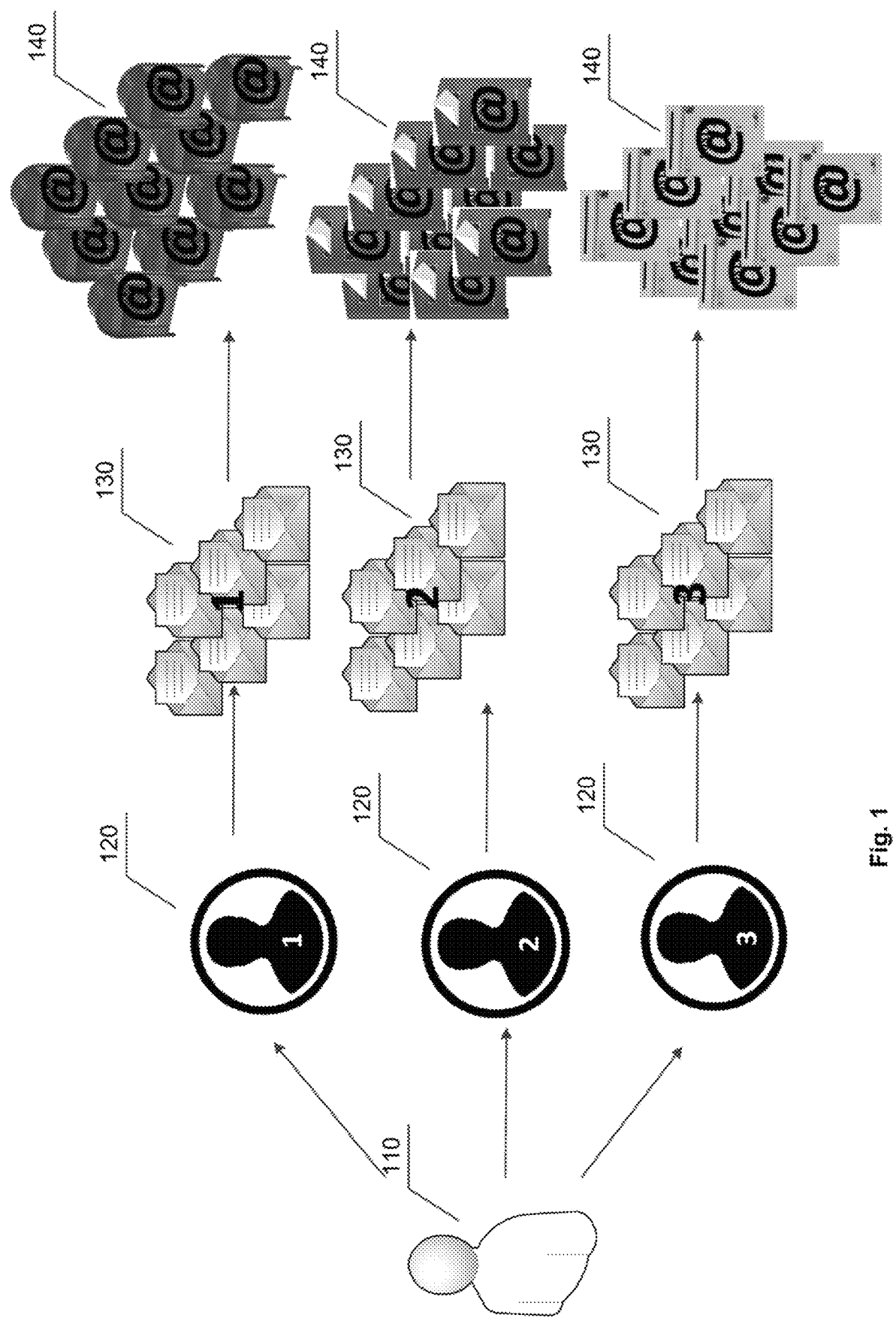
FIG. 1 is a diagram illustrating a case in which a single sender uses multiple hosts to send messages via bulk mailing.

Exemplary aspects are described herein in the context of a system, method, and computer program product detecting a harmful file. Those of ordinary skill in the art will realize that the following description is illustrative only and is not intended to be in any way limiting. Other aspects will readily suggest themselves to those skilled in the art having the benefit of this disclosure. Reference will now be made in detail to implementations of the example aspects as illustrated in the accompanying drawings. The same reference indicators will be used to the extent possible throughout the drawings and the following description to refer to the same or like items.

Glossary: a number of terms are defined herein which will be used to describe variant aspects of the present disclosure.

Electronic mail (or e-mail) is a set of services on a computer network for sending messages between its users. E-mail messages are typically used for rapidly delivering letters, program code, documents, and other similar correspondence. When a message is sent by e-mail, the sending and receiving computers do not necessarily communicate directly with each other.

An electronic mail or message is defined as a sequence of characters. E-mail messages may include characters with decimal codes from 1 to 127, interpreted according to US-ASCII encoding. An email message consists of header fields (the message header section), which is followed by the main part of the message (the body portion). The header section is a sequence of character strings with a predefined syntax. The message body is a sequence of characters that follows the header section and is separated from it by an empty string (a string containing only CRLF). As used herein, the term "an e-mail message" refers to an electronic message that is sent by electronic mail.

An attribute of an e-mail message is a necessary, essential, or integral property of an e-mail message.

A spam detection feature is a feature calculated based on a value of an e-mail message attribute that characterizes the presence of spam and which may be applied in machine learning technologies.

An e-mail message stream is a collection of electronic messages sent by e-mail that is received by one or more users. A set of e-mail messages is a fixed number of messages selected from the e-mail stream to perform a check for the presence of spam.

A sender (addresser, communicator) of an e-mail message is a participant in an electronic communication which composes an e-mail message to convey information to another participant and/or to influence another participant. As used herein, the term "a sender" refers to a sender of e-mail messages.

An e-mail sender profile is a collection of e-mail message attributes characterizing the characteristics of the sender. As used herein, the term "a sender profile" refers to the profile of an e-mail message sender.

Cyber attackers often use bulk mailing of e-mail messages containing spam. To implement a bulk distribution method, templates may be used to generate the text and content of the relevant e-mail messages. To make spam detection more difficult, the templates may be complemented by methods of obfuscation, anonymization, and on the like. In addition to aforementioned methods, there are various methods and services for obscuring the process of sending e-mail messages. A single sender may use either a single host or a network of hosts to send multiple e-mail messages. Messages may be sent at different frequencies and in different quantities at the same time.

FIG. 1 is a diagram illustrating a case in which a single sender uses multiple hosts to send messages via bulk mailing. In the illustrated case, a sender 110 may organize several variants of the transmission of e-mail messages. The variants may have their own special features and may represent profiles 120 of the sender 110. A bulk mailing of e-mail messages 130, sent using a single sender profile 120, may be directed to the mailboxes of specific users 140. To manage the process of receiving e-mail messages from senders, a system for restricting the reception of e-mail messages from a sender of bulk spam mail may be used that is described below.

Figure 2:
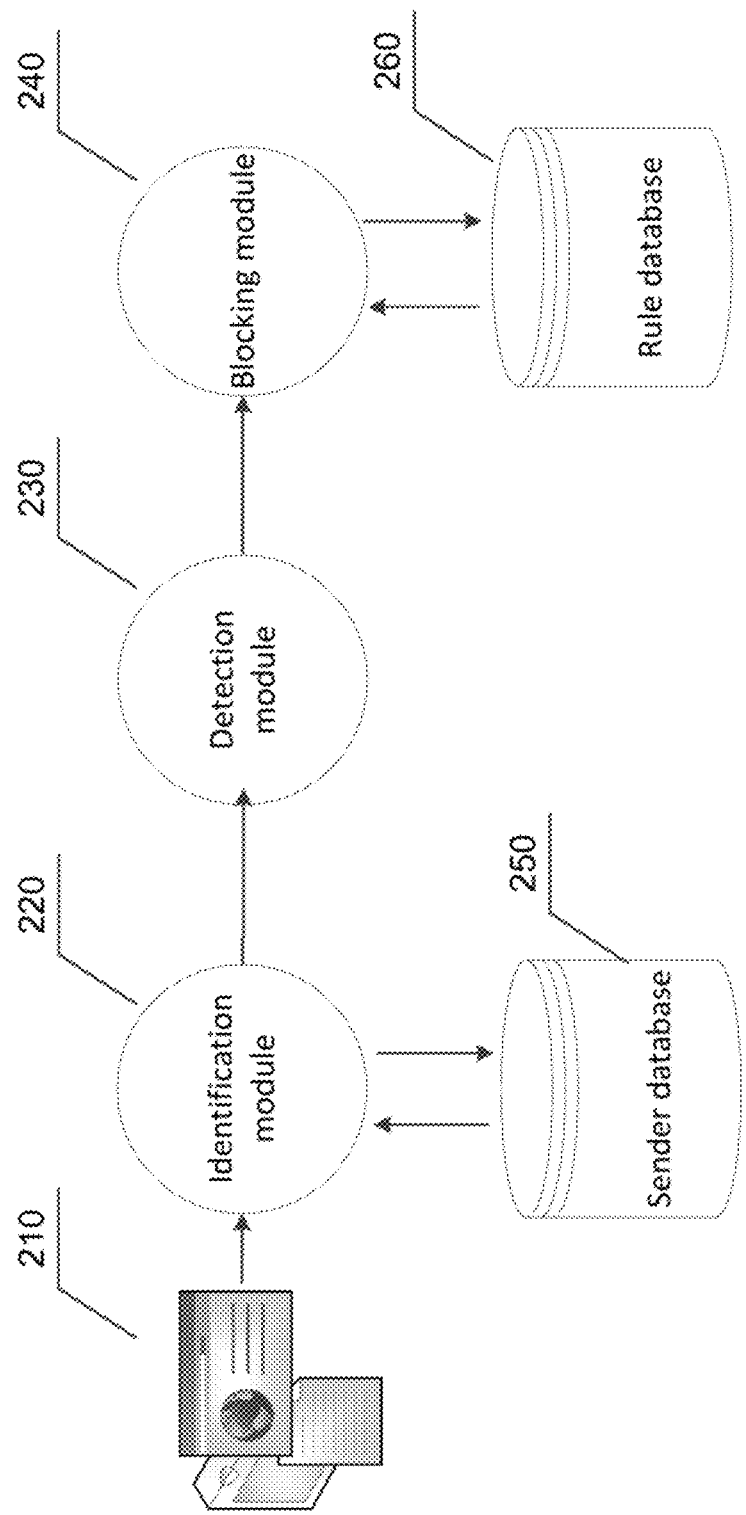
FIG. 2 illustrates an example architecture of a system for restricting the reception of e-mail messages from a sender of bulk spam mail.

FIG. 2 illustrates an example architecture of a system for restricting the reception of e-mail messages from a sender of bulk spam mail. In an aspect, the disclosed system may include, but is not limited to, an identification module 220, a detection module 230, a blocking module 240, a sender database 250, and a rule database 260.

The system shown in FIG. 2 is a computer system, for example a general-purpose computer, which has a hardware processor and memory. This system comprises software and/or hardware modules, which in turn contain instructions for execution on the hardware processor. Aspects of these system modules are described below.

The identification module 220 may be configured to identify an unknown sender of e-mail messages. In an aspect, the identification module 220 may identify an unknown sender of e-mail messages by generating a profile of the e-mail message sender and comparing the generated profile of the sender with known profiles of senders from the sender database 250. The identification module 220 may analyze each e-mail message from the e-mail message stream 210. As a result of the analysis, the identification module 220 may generate a profile of the sender of each e-mail message based on its attributes. The attributes of an e-mail message may include, but are not limited to: Internet Protocol (IP) address of the sender, size of the e-mail message, language of the e-mail message text, number of characters in the e-mail header, size of the e-mail message, and the like. Based on the attributes, the identification module 220 may compute data that is subsequently combined into the profile. The profile of the sender may be a set that includes, but is not limited to, the following data: the hash code of the body of the e-mail message, the hash code of the header of the e-mail message, the domain name of the sender, the IP address of the sender, the hash code of the HyperText Markup Language (HTML) layout of the e-mail message. For each profile, the identification module 220 may determine a degree of similarity to other known sender profiles based on the database 250 of senders.

For example, a first user may have received a first e-mail message. Based on the attributes of the first email message, the identification module 220 may compute the first sender profile based on the attributes of the first email message. Next, the first user may have received a second e-mail message. Based on the attributes of the second email message, the identification module 220 may compute the second sender profile. A second user may have received a third e-mail message. Based on the attributes of the third email message, the identification module 220 may compute the third sender profile. And so on. For illustrative purposes only, assume that total ten messages have been received.

In an aspect, machine-learning methods may be used by the identification module 220 to perform clustering of the computed profiles. This clustering may result in the first sender profile and the third sender profile being combined into a single sender profile 13, for example. Furthermore, eighth and ninth sender profiles may be combined into a profile 89. Then, the identification module 220 may perform classification, using machine learning methods, on the sender second, fourth, fifth, sixth, seventh and tenth profiles and the sender profiles 13 and 89. As a result of the classification, all profiles except 13 and 89 may have a high degree of similarity to known sender profiles. In an aspect, the combined sender profiles 13 and 89 may have a degree of similarity to known profiles of senders from the sender database below a predefined threshold value. Hence, the sender profiles 13 and 89 may be considered unknown. In the sender database 250, a sender may be created who in turn receives the name U111, which corresponds to the sender profile 13, and a sender may be created who in turn receives the name U112, which corresponds to the sender profile 89. The combined sender profile 13 may have the following parameters: hash code of body of the first message (identical to third), hash code of header of the first message (similar to third), first sender domain name, third sender domain name, first sender IP address, third sender IP address list, first hash code of html layout.

In an aspect, the threshold value of the degree of similarity may be determined statistically, empirically, or specified by an expert. There may be cases where multiple profiles match the same sender.

In addition, the identification module 220 may be configured to generate a set of e-mail messages received from the identified sender and to transfer the generated set of e-mail messages to the detection module 230. The set of e-mail messages received from the identified sender may be generated by selecting all e-mail messages from the identified sender from the e-mail message stream 210. Continuing with the example from the previous paragraph, the identified sender may be the unknown sender U111, which corresponds to profile 13. Accordingly, from e-mail messages with first and third sender profiles, the above-mentioned set of e-mails may be generated.

In an aspect, the detection module 230 may be configured to determine the type of bulk spam mailing based on the generated set of e-mail messages using signatures for identifying spam. In an aspect, the detection module 230 may identify bulk mailing by identifying similar groups of e-mail messages among the set of e-mail messages received from the identified sender, using machine learning methods, for example. Identified groups of e-mail messages from the generated set of e-mail messages may be checked for the presence of spam using spam detection signatures. For each type of spam, there may be a corresponding set of conditions, which when satisfied uniquely allocate the e-mail message to one type or another type of spam. For example, for the type of spam known as phishing, the conditions may include the inclusion of a Uniform Resource Locator (URL) link (a system of uniform addresses for electronic resources (files)) and the text of an e-mail message or hash code calculated from the text of an e-mail message containing the characters of a phishing phrase. The main types of spam may include but are not limited to:

advertising of goods and services, including illegal ones;
phishing, including "Nigerian letters" and chain letters;
propaganda;
distribution of applications containing malicious code;
false charity, etc.

Continuing the example from the previous paragraphs, the generated set of e-mail messages, which consists of first and third e-mail messages from sender profile 13, may be checked for the presence of spam and its type, for example, type 4—distribution of applications containing malicious code. The set of e-mail messages which consists of e-mail messages eight and nine from the sender profile 89 does not contain spam. In addition, the detection module 230 may be configured to generate restrictions on the reception of e-mail messages from a sender who distributes spam of the determined type. Furthermore, the detection module 230 may be configured to transmit data on the generated restrictions to the blocking module 240. The detection module 230 may be configured to create a restriction by temporarily including the profiles of senders from whom bulk spam mail is detected in the group of prohibited senders. Continuing the example from the previous paragraphs, an attacker may send e-mail messages containing spam of type 4 using the combined sender profile 13. Therefore, these messages may be subject to restrictions. For example, the sender's domain name 3, the sender's IP address 1, and the sender's IP address list 3 may be placed in the prohibited list for two weeks.

In an aspect, the blocking module 240 may be configured to check the generated restrictions for conflicts by using conflict identification rules from the rule database 260.

The term "a conflict of restrictions on the reception of e-mails from the sender", as used herein, refers to a situation where the prohibition on receiving e-mails from the sender for whatever reason is not justified, and its complete revocation or partial modification may be considered.

The term "a conflict identification rule", as used herein, refers to a set of conditions, which when satisfied determine whether the generated constraint should be revoked or modified.

One example of a conflict identification rule may include, but is not limited to, the following set of conditions: the spam type is determined as "advertising", the period of restriction is one week, the IP address from the identified sender profile is used by a company or user with a positive reputation, the IP address has never previously been restricted. If the above conditions are satisfied, the identified sender profile may be corrected and the blocked IP address may be excluded from the prohibited list. In an aspect, a repeat verification of the identified profile of the sender may be performed in seven days, for example.

Another example of a conflict identification rule may include, but is not limited to, the following set of conditions: the spam type is determined as "false charity", the restriction period is one month, the PTR-record (Domain Name Pointer—a pointer which acts as a reverse mapping of IP addresses in hostnames) corresponding to the IP address from the identified sender profile has an exclusively positive reputation, the IP address has never previously been restricted. If the above conditions are satisfied, the identified sender profile may be corrected and the blocked IP address may be excluded from the prohibited list. In an aspect, a renewed verification of the identified profile of the sender may be performed within one day, for example.

Another example of a conflict identification rule may include, but is not limited to the following set of conditions: the spam type is determined as "false charity", the restriction period is one week, the domain name from the identified sender profile has existed for ten years, the owner of the domain name actually exists as an individual person or company with a positive reputation, the domain name has never previously been under restrictions. If the above conditions are satisfied, the identified sender profile may be corrected and the blocked domain name may be excluded from the prohibited list. In an aspect, a renewed verification of the identified profile of the sender may be performed within one day, for example.

In addition, the blocking module 240 may be configured to modify the generated restriction when a conflict is detected.

Continuing the example from the previous paragraphs, assume that two rules were processed during the conflict check, which prescribed the exclusion of domain name 1 and one of the IP addresses from the list of IP addresses of the third sender from the prohibited list. This step may correct the sender's profile 13 and the lists of prohibited domain names and IP addresses.

In an aspect, the sender database 250 may be configured to store data about known profiles of senders. In an aspect, the rule database 260 may be configured to store the conflict identification rules. Different types of databases can be used for the sender database 250 and the rule database 260, such as, but not limited to, hierarchical (IMS, TDMS, System 2000), network-based (Ceredrum, Cronospro, DBVist), relational (DB2, Informix, Microsoft SQL Server), object-oriented (Jasmine, Versant, POET), object-relational (Oracle Database, PostgreSQL, FirstSQL/J), functional, and the like. In an aspect, the rules may be created using machine learning algorithms and automated processing of large data sets.

An exemplary implementation is presented below, in a simplified form, for illustrative purposes only.

Exemplary implementation of sender profile computation and merging:

```
E-mail message 1:
Sender-IP: 1.1.1.1
From: alex@baddomain.com
To: test@localdomain
Content-type: text/html;
Subject: Hi!
<html>
<body>
<link href="http://request/redirect.php", rel="try link">
</body>
E-mail message 3:
Sender-IP: 1.1.1.2
From: petr@graydomain.com
To: test@localdomain
Content-type: text/html;
Subject: Hello!
<html>
<body>
<link href="http://pull/random.php", rel="good link">
</body>
```

The exemplary e-mails above may be similar to the hash code of message headers (header_md5: af14) and the hash code of an html layout (html_md5: ba6). Thus, the sender's profile may be related one-to-many to the list of IP addresses [1.1.1.1, 1.1.1.2].

Exemplary implementation of conflict identification rules:
1. BLOCK_IP_LIST (prohibited list) contains the entries:
   (1.1.1.2, 1.1.1.3, 1.1.1.4, 2.2.2.2)
   ALLOW_IP_list_ORG (trusted list) contains the entries:
   1.1.1.2: Good_Organization
   2.2.2.1: Good_Organization If information about the IP address 1.1.1.2 is found in the generated restrictions, the restriction may be changed by the blocking module 240. This list of trusted senders may be derived from an analysis of multiple e-mail streams and traps, and from the identification of IP address and domain name ranges belonging to large organizations.

2. BLOCK_IP_LIST contains the entries: (1.1.1.2, 1.1.1.3, 1.1.1.4, 2.2.2.3),
   2021-10-08; 1.1.2; none
   2021-10-08; 1.1.3; none
   2021-10-08; 2.2.2.3; mail.good.ptr The IP address 2.2.2.3 may be excluded from the prohibited list because it will not pass the PTR record check.

3. BLOCK_DOMAIN_LIST contains the entries: (baddomain1, baddomain2, gooddomain)

Baddomain1; created: 2021-10-11; owner: unknown
Baddomain2; created: 2021-10-11; owner: unknown
Gooddomain; created: 2003-08-08; owner: good_company The domain name gooddomain may be excluded from the list of prohibited domain names because it will not pass the verification of the creation date and owner of this domain name.

Figure 3:
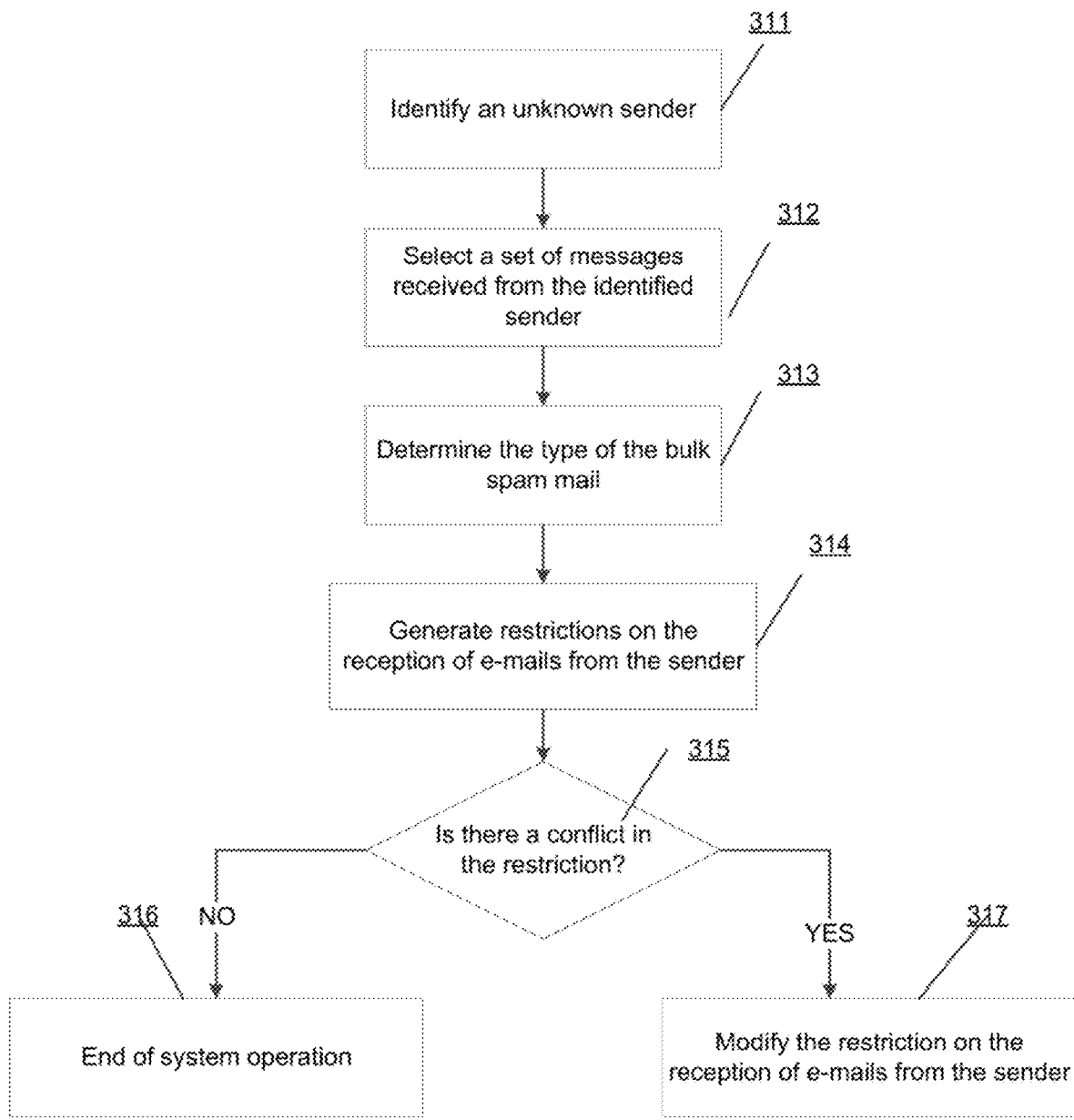
FIG. 3 is a flowchart illustrating an example method for restricting the reception of e-mail messages from a sender of bulk spam mail.

FIG. 3 is a flowchart illustrating an example method for restricting the reception of e-mail messages from a sender of bulk spam mail. In an aspect, at step 311, the identification module 220 may identify an unknown sender of e-mail messages, as described above. At step 312, the identification module 220 may select a set of e-mail messages received from the identified sender and may transmit the selected set of e-mail messages to the detection module 230. At step 313, the detection module 230 may determine the type of the bulk spam mailing based on the generated set of e-mail messages using spam identification signatures, as described above. At step 314, the detection module 230 may generate restrictions on the reception of e-mail messages from a sender who is distributing spam of the determined type. In addition, the detection module 230 may transmit data about the generated restrictions to the blocking module 240. At step 315, the blocking module 240 may check the generated restrictions for any conflicts created, by using the conflict identification rules from the rule database 260. In response to finding a conflict (decision block 315, yes branch), at step 317, the blocking module 240 may modify the generated restriction. If there are no conflicts (decision block 315, no branch), at step 316, the disclosed system may terminate operation.

Figure 4:
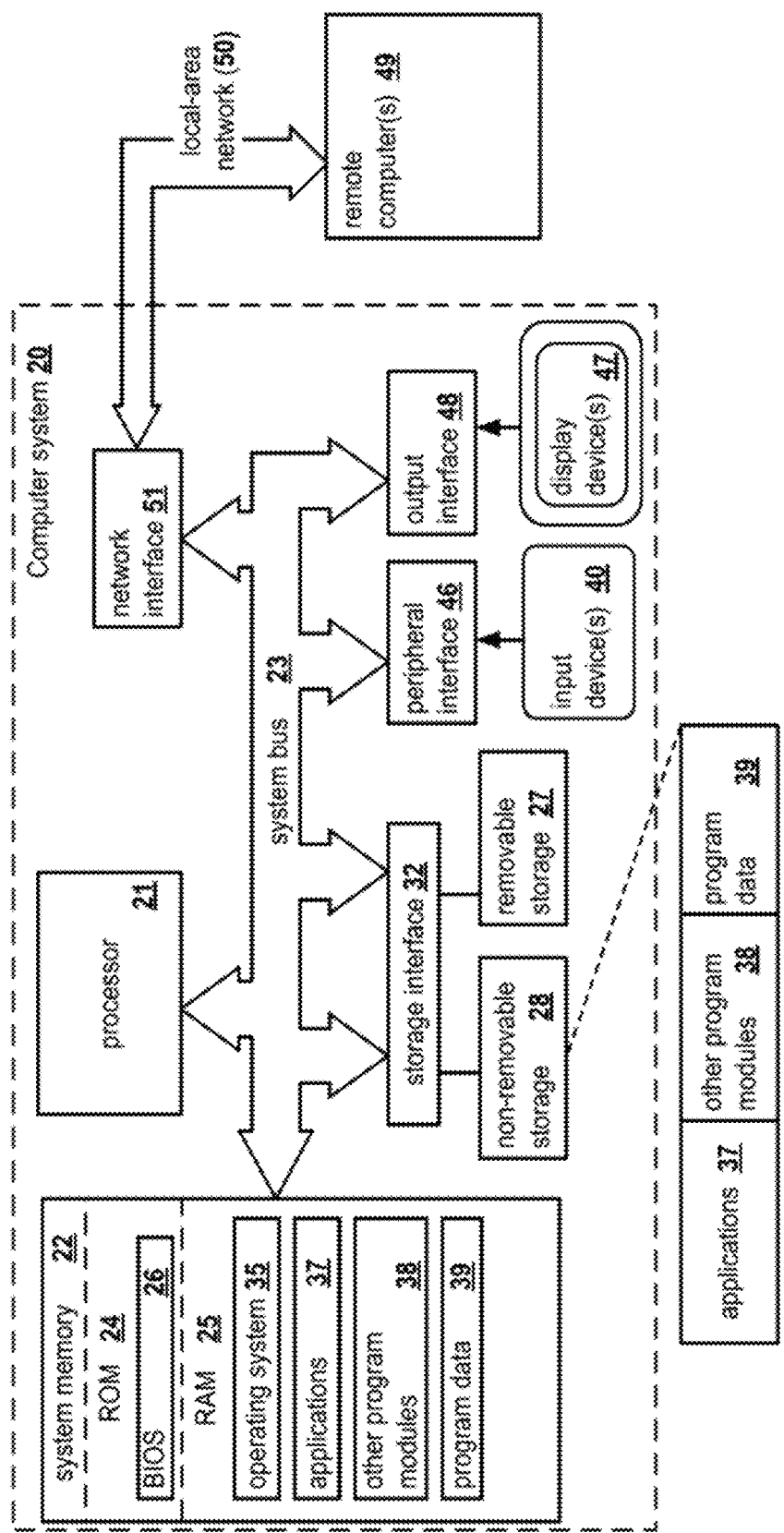
FIG. 4 shows an example of a computer system on which variant aspects of systems and methods disclosed herein may be implemented.

FIG. 4 shows an example of a computer system on which variant aspects of systems and methods disclosed herein may be implemented. The computer system 20 may represent the system for restricting the reception of e-mail messages from a sender of bulk spam mail of FIG. 2 and can be in the form of multiple computing devices, or in the form of a single computing device, for example, a desktop computer, a notebook computer, a laptop computer, a mobile computing device, a smart phone, a tablet computer, a server, a mainframe, an embedded device, and other forms of computing devices.

As shown, the computer system 20 includes a central processing unit (CPU) 21, a system memory 22, and a system bus 23 connecting the various system components, including the memory associated with the central processing unit 21. The system bus 23 may comprise a bus memory or bus memory controller, a peripheral bus, and a local bus that is able to interact with any other bus architecture. Examples of the buses may include PCI, ISA, PCI-Express, Hyper-Transport™, InfiniBand™, Serial ATA, I2C, and other suitable interconnects. The central processing unit 21 (also referred to as a processor) can include a single or multiple sets of processors having single or multiple cores. The processor 21 may execute one or more computer-executable code implementing the techniques of the present disclosure. The system memory 22 may be any memory for storing data used herein and/or computer programs that are executable by the processor 21. The system memory 22 may include volatile memory such as a random access memory (RAM) 25 and non-volatile memory such as a read only memory (ROM) 24, flash memory, etc., or any combination thereof. The basic input/output system (BIOS) 26 may store the basic procedures for transfer of information between elements of the computer system 20, such as those at the time of loading the operating system with the use of the ROM 24.

The computer system 20 may include one or more storage devices such as one or more removable storage devices 27, one or more non-removable storage devices 28, or a combination thereof. The one or more removable storage devices 27 and non-removable storage devices 28 are connected to the system bus 23 via a storage interface 32. In an aspect, the storage devices and the corresponding computer-readable storage media are power-independent modules for the storage of computer instructions, data structures, program modules, and other data of the computer system 20. The system memory 22, removable storage devices 27, and non-removable storage devices 28 may use a variety of computer-readable storage media. Examples of computer-readable storage media include machine memory such as cache, SRAM, DRAM, zero capacitor RAM, twin transistor RAM, eDRAM, EDO RAM, DDR RAM, EEPROM, NRAM, RRAM, SONOS, PRAM; flash memory or other memory technology such as in solid state drives (SSDs) or flash drives; magnetic cassettes, magnetic tape, and magnetic disk storage such as in hard disk drives or floppy disks; optical storage such as in compact disks (CD-ROM) or digital versatile disks (DVDs); and any other medium which may be used to store the desired data and which can be accessed by the computer system 20.

The system memory 22, removable storage devices 27, and non-removable storage devices 28 of the computer system 20 may be used to store an operating system 35, additional program applications 37, other program modules 38, and program data 39. The computer system 20 may include a peripheral interface 46 for communicating data from input devices 40, such as a keyboard, mouse, stylus, game controller, voice input device, touch input device, or other peripheral devices, such as a printer or scanner via one or more I/O ports, such as a serial port, a parallel port, a universal serial bus (USB), or other peripheral interface. A display device 47 such as one or more monitors, projectors, or integrated display, may also be connected to the system bus 23 across an output interface 48, such as a video adapter. In addition to the display devices 47, the computer system 20 may be equipped with other peripheral output devices (not shown), such as loudspeakers and other audiovisual devices.

The computer system 20 may operate in a network environment, using a network connection to one or more remote computers 49. The remote computer (or computers) 49 may be local computer workstations or servers comprising most or all of the aforementioned elements in describing the nature of a computer system 20. Other devices may also be present in the computer network, such as, but not limited to, routers, network stations, peer devices or other network nodes. The computer system 20 may include one or more network interfaces 51 or network adapters for communicating with the remote computers 49 via one or more networks such as a local-area computer network (LAN) 50, a wide-area computer network (WAN), an intranet, and the Internet. Examples of the network interface 51 may include an Ethernet interface, a Frame Relay interface, SONET interface, and wireless interfaces.

Aspects of the present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store program code in the form of instructions or data structures that can be accessed by a processor of a computing device, such as the computing system 20. The computer readable storage medium may be an electronic storage device, a magnetic storage device, an optical storage device, an electromagnetic storage device, a semiconductor storage device, or any suitable combination thereof. By way of example, such computer-readable storage medium can comprise a random access memory (RAM), a read-only memory (ROM), EEPROM, a portable compact disc read-only memory (CD-ROM), a digital versatile disk (DVD), flash memory, a hard disk, a portable computer diskette, a memory stick, a floppy disk, or even a mechanically encoded device such as punch-cards or raised structures in a groove having instructions recorded thereon. As used herein, a computer readable storage medium is not to be construed as being transitory signals per se, such as radio waves or other freely propagating electromagnetic waves, electromagnetic waves propagating through a waveguide or transmission media, or electrical signals transmitted through a wire.

Computer readable program instructions described herein can be downloaded to respective computing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network interface in each computing device receives computer readable program instructions from the network and forwards the computer readable program instructions for storage in a computer readable storage medium within the respective computing device.

Computer readable program instructions for carrying out operations of the present disclosure may be assembly instructions, instruction-set-architecture (ISA) instructions, machine instructions, machine dependent instructions, microcode, firmware instructions, state-setting data, or either source code or object code written in any combination of one or more programming languages, including an object oriented programming language, and conventional procedural programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or WAN, or the connection may be made to an external computer (for example, through the Internet). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

In various aspects, the systems and methods described in the present disclosure can be addressed in terms of modules. The term "module" as used herein refers to a real-world device, component, or arrangement of components implemented using hardware, such as by an application specific integrated circuit (ASIC) or FPGA, for example, or as a combination of hardware and software, such as by a microprocessor system and a set of instructions to implement the module's functionality, which (while being executed) transform the microprocessor system into a special-purpose device. A module may also be implemented as a combination of the two, with certain functions facilitated by hardware alone, and other functions facilitated by a combination of hardware and software. In certain implementations, at least a portion, and in some cases, all, of a module may be executed on the processor of a computer system. Accordingly, each module may be realized in a variety of suitable configurations, and should not be limited to any particular implementation exemplified herein.

In the interest of clarity, not all of the routine features of the aspects are disclosed herein. It would be appreciated that in the development of any actual implementation of the present disclosure, numerous implementation-specific decisions must be made in order to achieve the developer's specific goals, and these specific goals will vary for different implementations and different developers. It is understood that such a development effort might be complex and time-consuming, but would nevertheless be a routine undertaking of engineering for those of ordinary skill in the art, having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of those skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

The invention claimed is:

1. A method for restricting reception of e-mail messages from a sender of bulk spam mail, the method comprising:
   identifying an unknown sender of received e-mail messages;
   selecting a set of e-mail messages received from the identified sender;
   determining a type of bulk spam mailing based on the selected set of e-mail messages using one or more spam identification signatures;
   generating restrictions on reception of e-mail messages from a sender distributing bulk spam of the determined type;
   checking the generated restrictions for conflicts using one or more conflict identification rules from a rule database configured to store conflict identification rules; and
   modifying the generated restrictions in response to detecting a conflict.

2. The method of claim 1, wherein identifying the sender comprises:
   generating a profile of the sender of the received e-mail messages; and
   comparing the generated profile with known sender profiles from a sender database.

3. The method of claim 2, wherein the generating restrictions comprises temporarily including the generated profile of the sender to a list of prohibited senders.

4. The method of claim 3, wherein the generated restriction is modified, if the conflict is detected, by excluding an IP address that caused the conflict from the list of prohibited senders.

5. The method of claim 3, wherein the generated restriction is modified, if the conflict is detected, by excluding a domain name that caused the conflict from the list of prohibited senders.

6. The method of claim 2, wherein the profile of the sender comprises one or more of: a hash code of a body of the received e-mail message, a hash code of a header of the received e-mail message, a domain name of the sender of the received e-mail message, an IP address of the sender of the received e-mail message, a hash code of an HTML-layout of the received e-mail message.

7. The method of claim 2, wherein the sender database is configured to store profiles of known senders.

8. The method of claim 2, further comprising, in response to detecting the conflict, modifying the profile of the sender in which the conflict was detected.

9. The method of claim 1, wherein the conflict identification rules identify whether the generated restrictions are to be modified, wherein the modification comprises a prohibition on receiving emails from the sender being at least partially revoked.

10. The method of claim 9, wherein the one or more conflict identification rules comprises a set of conditions satisfaction of which indicates that the generated restriction needs a modification.

11. A system for restricting reception of e-mail messages from a sender of bulk spam mail, the system comprising:
    a memory and a hardware processor configured to:
       identify an unknown sender of received e-mail messages;
       select a set of e-mail messages received from the identified sender;
       determine a type of bulk spam mailing based on the selected set of e-mail messages using one or more spam identification signatures;
       generate restrictions on reception of e-mail messages from a sender distributing bulk spam of the determined type;
       checking the generated restrictions for conflicts using one or more conflict identification rules from a rule database configured to store conflict identification rules, wherein the conflict identification rules identify whether the generated restrictions are to be modified, wherein the modification comprises a prohibition on receiving emails from the sender being at least partially revoked; and
       modifying the generated restrictions in response to detecting a conflict.

12. The system of claim 11, wherein the hardware processor configured to identify the sender is further configured to:
    generate a profile of the sender of the received e-mail messages; and
    compare the generated profile with known sender profiles from a sender database.

13. The system of claim 12, wherein the hardware processor configured to generate restrictions is further configured to temporarily include the generated profile of the sender to a list of prohibited senders.

14. The system of claim 13, wherein the generated restriction is modified, if the conflict is detected, by excluding an IP address that caused the conflict from the list of prohibited senders.

15. The system of claim 13, wherein the generated restriction is modified, if the conflict is detected, by excluding a domain name that caused the conflict from the list of prohibited senders.

16. The system of claim 12, wherein the profile of the sender comprises one or more of: a hash code of a body of the received e-mail message, a hash code of a header of the received e-mail message, a domain name of the sender of the received e-mail message, an IP address of the sender of the received e-mail message, a hash code of an HTML-layout of the received e-mail message.

17. The system of claim 12, wherein the sender database is configured to store profiles of known senders.

18. The system of claim 11, wherein the conflict identification rules identify whether the generated restrictions are to be modified, wherein the modification comprises a prohibition on receiving emails from the sender being at least partially revoked.

19. The system of claim 18, wherein the one or more conflict identification rules comprises a set of conditions satisfaction of which indicates that the generated restriction needs a modification.

20. A non-transitory computer readable medium storing thereon computer executable instructions for restricting reception of e-mail messages from a sender of bulk spam mail, including instructions for:
 identifying an unknown sender of received e-mail messages;
 selecting a set of e-mail messages received from the identified sender;
 determining a type of bulk spam mailing based on the selected set of e-mail messages using one or more spam identification signatures;
 generating restrictions on reception of e-mail messages from a sender distributing bulk spam of the determined type;
 checking the generated restrictions for conflicts using one or more conflict identification rules from a rule database configured to store conflict identification rules; and
 modifying the generated restrictions in response to detecting a conflict.

* * * * *